United States Patent [19]

Bainbridge

[11] Patent Number: 5,092,122

[45] Date of Patent: Mar. 3, 1992

[54] MEANS AND METHOD FOR INSULATING AUTOMOTIVE EXHAUST PIPE

[75] Inventor: David W. Bainbridge, Littleton, Colo.

[73] Assignee: Manville Corporation, Denver, Colo.

[21] Appl. No.: 558,734

[22] Filed: Jul. 26, 1990

[51] Int. Cl.$^5$ .............................. F01N 7/14; F01N 7/18
[52] U.S. Cl. ................................ 60/272; 29/890.08; 138/149; 138/173; 181/252
[58] Field of Search ................. 60/272, 322; 138/149, 138/173, 110; 29/890.036, 890.037, 890.08, 433, 509; 181/222, 224, 228, 247, 248, 252, 256

[56] References Cited

U.S. PATENT DOCUMENTS

| | | | |
|---|---|---|---|
| 3,058,861 | 10/1962 | Rutter | 138/149 |
| 3,209,856 | 10/1965 | Saunders | 181/228 |
| 4,345,430 | 8/1982 | Pallo et al. | 60/282 |
| 4,790,686 | 12/1988 | Christ et al. | 405/124 |
| 4,998,597 | 3/1991 | Bainbridge | 181/243 |

Primary Examiner—Ira S. Lazarus
Assistant Examiner—Leonard Heyman
Attorney, Agent, or Firm—John D. Lister; Cornelius P. Quinn

[57] ABSTRACT

Insulating the exhaust pipe of an internal combustion exhaust system by sliding a flexible insulated tube over the exhaust pipe. The tube comprises concentrically arranged inner and outer corrugated stainless steel tubes, with the annulus between the corrugated tubes filled with refractory fiber insulation. The wall thickness of the corrugated tubes is in the range of 0.002 inch and 0.004 inch, which provides the insulated tube with sufficient flexibility to be trained over the angled portions of the exhaust pipe. The contact between the corrugations and the pipe assists in holding the insulated tube in place. The inner tube may extend beyond the outer tube and be flared back to the outer tube to enclose the insulation and facilitate movement of the insulated tube over the exhaust pipe. Alternatively, the insulation may also be sealed by end caps.

2 Claims, 2 Drawing Sheets

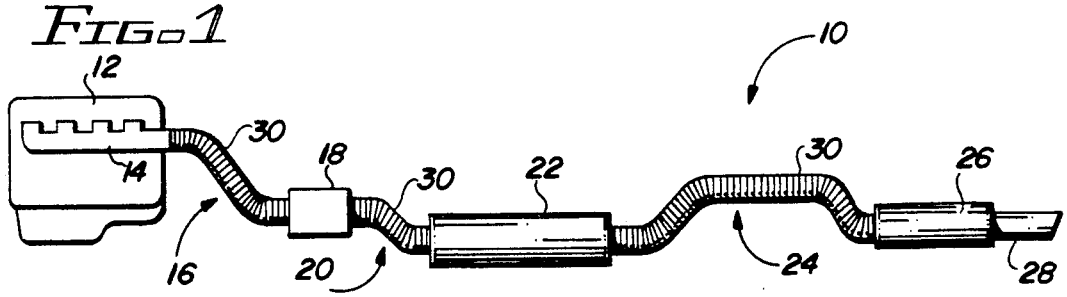
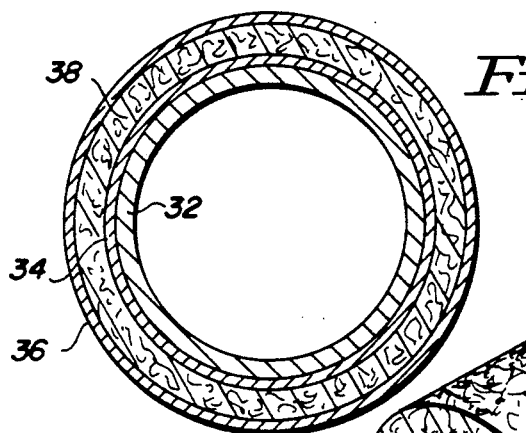
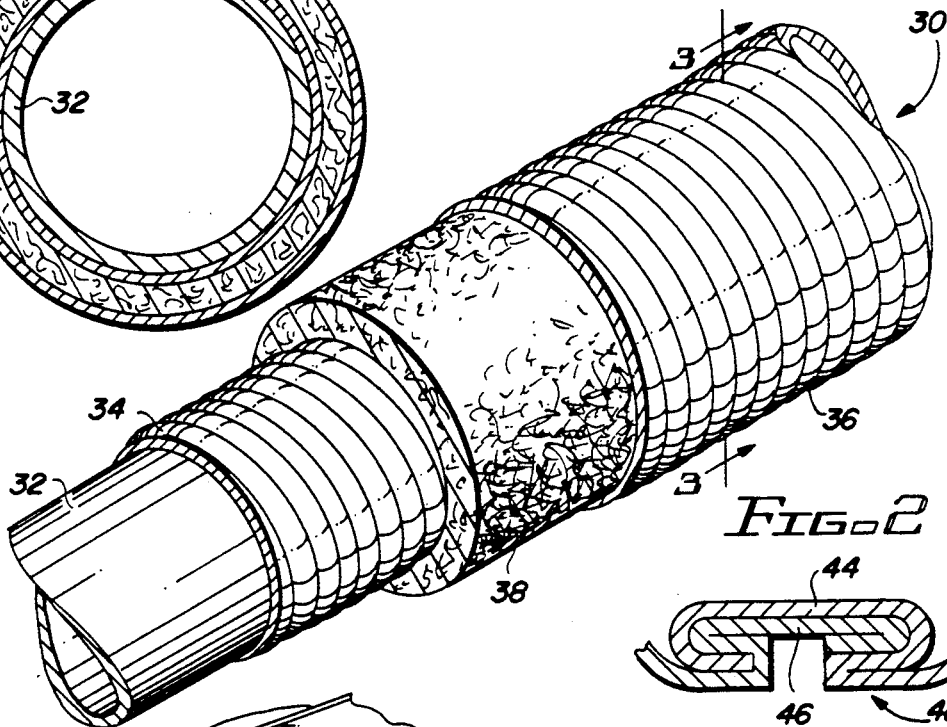
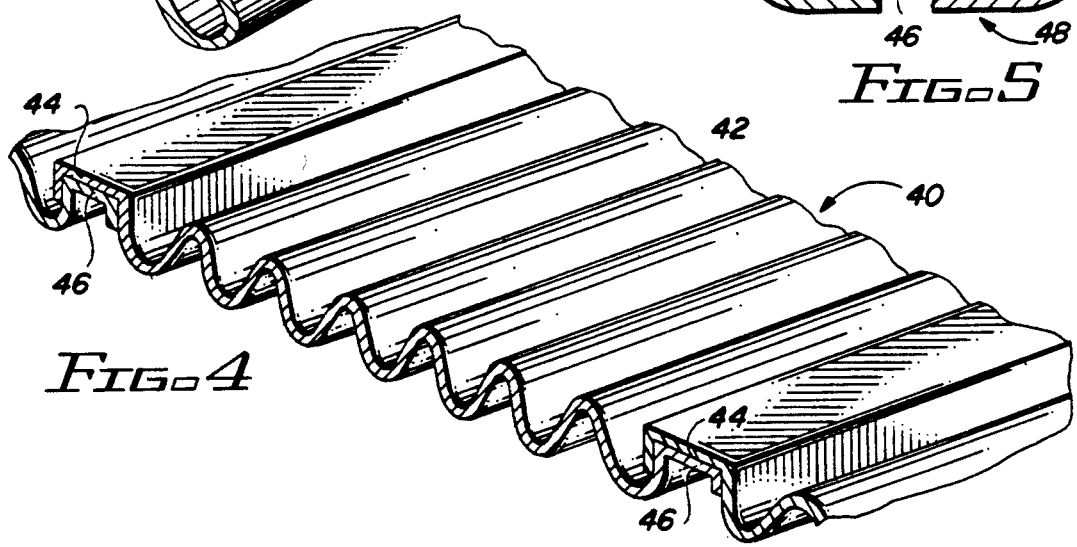

MEANS AND METHOD FOR INSULATING AUTOMOTIVE EXHAUST PIPE

FIELD OF THE INVENTION

This invention relates to an insulated exhaust pipe in the exhaust system of a vehicle powered by an internal combustion engine. More particularly, it relates to a means and method for insulating a standard exhaust pipe.

BACKGROUND OF THE INVENTION

The use of catalytic converters in the exhaust system of automotive vehicles has caused attention to be given to means for retaining the high heat of exhaust gases as they are delivered to the catalytic converter. By delivering gases to the converter at very high temperatures, the light-off period of the converter, that is, the time required for the catalytic converter to reach its light-off temperature, can be shortened, resulting in less pollution being exhausted to the atmosphere.

The problem has been approached in the past by insulating the exhaust pipe between the engine manifold and the catalytic converter, primarily by substituting specially designed insulated pipe for the exhaust pipe normally employed. This requires the use of pipe which not only has the necessary insulating qualities, but which also is structurally capable of resisting the various stresses to which the pipe is subjected during normal installation and use.

An example of such pipe can be found in U.S. Pat. No. 4,345,430, which discloses a double pipe system comprised of inner and outer corrugated metal tubes with refractory fiber insulation in the space between the tubes. Although this arrangement is functional, it was found that vibration of the insulated exhaust tubing during normal use of the vehicle caused the refractory fiber insulation to be reduced to dust-like particles, thereby substantially eliminating the insulating properties of the material. Further, the need to make the insulated pipe strong enough to withstand the rigors of use has required that relatively heavy and rigid corrugated strips be used to form the corrugated tubes, making the pipe more expensive than desired.

In addition to the need to insulate exhaust gases for the purpose of efficient operation of catalytic converters, it would be desirable to be able to insulate other portions of the exhaust pipe system so as to function as a heat shield and to absorb exhaust system noise. The substitution of available insulated exhaust pipe for conventional exhaust pipe in order to accomplish these goals would, however, be quite expensive, and the insulated pipe would still not normally be as strong as conventional exhaust pipe.

It would be highly desirable to be able to insulate conventional automotive exhaust pipe in a simple, inexpensive manner instead of substituting new pipe for the conventional pipe. This should include the ability to insulate curved, angled and dimpled portions of the exhaust pipe as well as straight portions.

SUMMARY OF THE INVENTION

In accordance with the invention, an insulated tube is provided which is capable of being slid over the conventional type of exhaust pipe of a vehicle, including the angled or curved portions thereof. The tube comprises an inner metallic tube having a slightly greater diameter than that of the exhaust pipe, and an outer metallic tube of greater diameter than that of the inner metallic tube. The outer tube is radially spaced from the inner tube and insulation which is capable of withstanding the high temperatures of the exhaust gases fills the annulus between the inner and outer tubes.

Means are further provided for permitting the insulated tube to be slid over the angled portions of the automotive exhaust pipe. In the preferred embodiment, this is accomplished by providing the inner and outer tubes with corrugations having a wall thickness of only approximately 0.002 inch to 0.004 inch. This results in a very lightweight inexpensive insulated tube which can be trained over the existing exhaust pipe, thus obviating any need to replace the exhaust pipe. This approach retains the structural integrity of the original exhaust pipe while allowing the pipe to be insulated in a simple economic manner. The means for holding the insulation in place can be of simple design because there is no need for special design features to enable it to be moved tranversely into place on the exhaust pipe. Instead, as indicated above, the insulation may simply be slid over the length of the pipe, regardless of the contour of the exhaust pipe.

The above and other aspects of the invention, as well as other benefits, will readily be ascertained from the more detailed description of the preferred embodiments which follow.

BRIEF DESCRIPTION OF THE DRAWINGS

FIG. 1 is a schematic view of an automotive exhaust system incorporating the insulated tube of the present invention;

FIG. 2 is a partial pictorial view of an automotive exhaust pipe insulated by the insulated tube of the present invention, parts of the elements of the tube being broken away for the sake of clarity;

FIG. 3 is a transverse sectional view taken along line 3—3 of FIG. 2;

FIG. 4 is an enlarged pictorial view of a corrugated strip which can be used to form the inner and outer corrugated tubes;

FIG. 5 is an enlarged transverse sectional view of the seam resulting from bending or folding pressure being applied to the overlapped portions of the strip of FIG. 4;

DETAILED DESCRIPTION OF THE PREFERRED EMBODIMENTS

Figure 6:
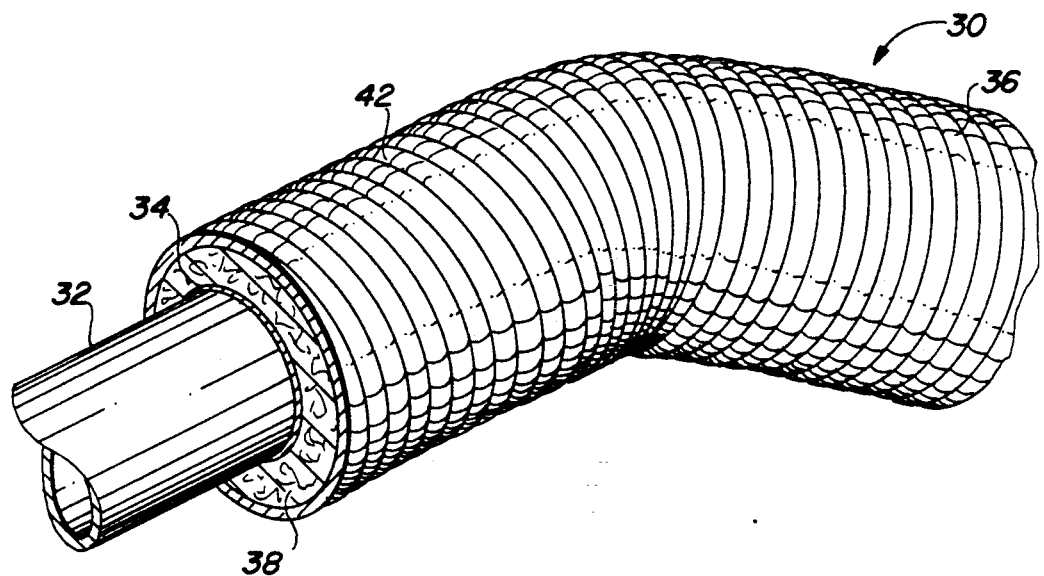
FIG. 6 is a partial pictorial view of the insulated tube of the invention positioned on an angled portion of the exhaust pipe.

Referring to FIG. 1, an automotive exhaust system 10 is illustrated schematically as comprising internal combustion engine 12, exhaust manifold 14, and an exhaust pipe section 16 connecting the manifold and catalytic converter 18. Another exhaust pipe section 20 connects the catalytic converter 18 to muffler 22, and a further section 24 connects the muffler 22 to resonator 26. A tail pipe section 28 extends from the resonator 26. Each of the exhaust pipe sections includes at least one angled or curved section, which is typical of automotive exhaust pipe installations, and each pipe section is jacketed by the insulated tube 30 of the present invention.

Referring to FIGS. 2 and 3, exhaust pipe 32, which may be the exhaust pipe of any of the sections 16, 20 and 24, is jacketed by the insulated tube 30. The insulated tube 30 comprises spaced inner and outer corrugated tubes 34 and 36, with the annulus between the tubes being filled by a layer of insulation 38. The insulated tube 30 is provided as a unit, and the inner and outer corrugated tubes of which may be fabricated in any convenient way, as by the known method of feeding a corrugated strip of metal to a forming roller and mandrel at a predetermined angle to the mandrel. Such a process results in the corrugations of the resulting helically wound tube extending at an angle to the length of the tube equal to the angle at which the corrugated strip was fed to the mandrel.

An illustrative corrugated strip is shown in FIG. 4, wherein the strip 40 includes a number of parallel corrugations 42 the formation of which by a series of corrugating rollers is well known. Although any suitable seam may be used to connect adjacent strips in forming a corrugated tube, the strip 40 is shown for purpose of illustration as having a large connecting flange 44 at one edge and a smaller connecting flange 46 at the other edge. The smaller flange 46 of the strip fits into the larger adjacent flange 44 as the strip is wound about the mandrel, and the nested flanges are then subjected to pressure sufficient to fold the flanges in, as by a roller. This produces the gas-tight seam 48 shown in FIG. 5.

The finished insulated tube may be formed by any convenient method, such as by winding a layer of insulation around the inner tube 34, then forming the outer tube 36 around the insulation while the inner tube 34 and the insulation 38 are in place on the forming mandrel. Another method is to form the tubes 34 and 36 separately and then push the insulation into the annulus between the tubes while holding the tubes in their final spaced positions. Whatever production method is used, the final insulated tube will comprise concentrically arranged corrugated tubes having insulation extending between them along the length of the tubes.

Although the concept of the invention does not depend on the use of any particular insulation, in practice the insulation must be sufficiently resistant to the high temperatures of exhaust gases, typically in the range of 1600° F. to 1800° F. Although other materials are capable of withstanding temperatures up to 1600° F., refractory fiber insulation is the most practical choice of insulation from the standpoint of resistance to temperatures exceeding the 1600° F., and from the standpoints of insulating ability, cost and weight. Its low density of 4 pcf to 16 pcf permits refractory fiber insulation to be wrapped around the inner corrugated tube without damage.

Although the dimensions of the corrugated strip may vary, it will be appreciated that the width of the strip will be fairly narrow in order to form tubes which will be only slightly larger in diameter than the outside diameter of the exhaust pipe over which it is to fit. In a typical arrangement, the inner and outer tubes may be formed of corrugated strips which are about 1¼ inches in width and which contain a number of corrugations, perhaps 5 to 7, in addition to the end flanges.

The material of the corrugated strips must be able to withstand the heat generated by the exhaust gases, be thin enough to enable maximum flexing of the corrugations when the tubes formed from the strip are pushed over bends in an exhaust pipe, and be able to withstand the stresses caused by the application procedure and the fatigue encountered during use. It should also be noncorrosive. The preferred material is stainless steel having a thickness in the range of 0.002 inch to 0.004 inch. This is considerably thinner than the metal of corrugated tubes intended to function as the exhaust pipe itself. In those installations the thickness of the metal is in the range of about 0.005 inch to 0.010 inch in order to provide enough strength to function as the exhaust pipe and to resist fatigue. Prior to this invention, that thickness range was considered to be the minimum that should be used. The extremely thin material used in the present invention gives the corrugated tubes the flexibility needed to be moved over curved or angled portions of an exhaust pipe. If material thinner than about 0.002 inch were used the resulting tube would not have the necessary structural integrity, while material thicker than 0.004 inch would not have the necessary flexibility.

In use, a length of the insulated tube of the invention is pushed onto an exhaust pipe and moved along the entire extent of the pipe, at least up to the point at which a flange or other type of pipe mounting means is intended to be located. When the tube encounters a bend or curve in the exhaust pipe, the extreme flexibility of the insulated tube enables it to conform to the curvature of the pipe. Thus in FIG. 6 the tube 30 has been slid over the curved portion of exhaust pipe 32, with the corrugations 42 being more widely spaced apart at the convex side of the curve and more closely spaced apart at the concave side of the curve than their original spacing.

Figure 7:
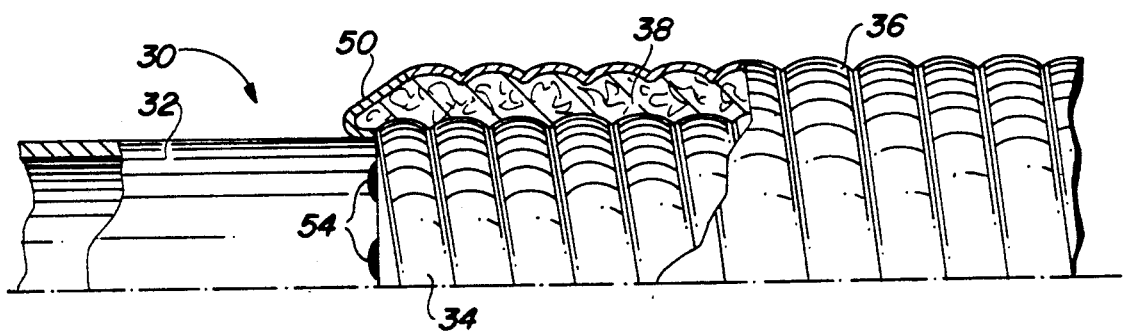
FIG. 7 is an enlarged partial side elevation of the insulated tube showing means for enclosing the insulation at the end of the tube.

In order to prevent moisture from entering the insulation at the ends of the tube it is preferred to provide an end enclosure. One way of accomplishing this is illustrated in FIG. 7, wherein the inner tube 34 extends beyond the end of the insulation layer 38 and the end of the outer tube 36, and is folded or flared back to the outer tube to form a circumferential lip 50. This arrangement not only encloses the end of the insulation 38, but also facilitates movement of the insulated tube over the surface of the exhaust pipe by preventing the possible snagging of the leading edge of the inner tube 34 on the exhaust pipe. Of course the same configuration can be provided at the other end of the tube in order to enclose the insulation at that end as well, even though snagging against the exhaust pipe is not a problem at the trailing edge of the tube.

Figure 8:
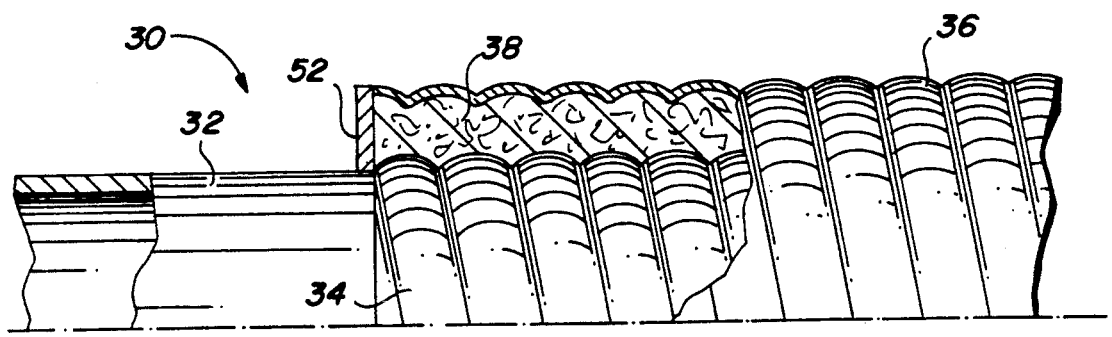
FIG. 8 is an enlarged partial side elevation similar to the view of FIG. 7, but showing another embodiment for enclosing the insulation at the end of the tube.

Another way of enclosing the insulation and facilitating movement of the insulated tube over the exhaust pipe is illustrated in FIG. 8, wherein an end cap 52 has been provided between the inner and outer tubes. The end cap may be installed in any convenient manner, a preferred method being to melt a ring formed of zinc while held in place on the end of the insulated tube. The melted metal will bond to the tubes 34 and 36 to form a permanent enclosure.

The insulated tube may be held in place on the exhaust pipe by tack welding it directly to the pipe as illustrated in FIG. 7 at 54. In many cases, however, it will be unnecessary to provide any special attachment means. When installed on exhaust pipes that are sharply angled or curved, the gripping contact between the corrugations of the inner tube and the exhaust pipe in the angled or curved section will be enough to securely hold the tube in place.

As mentioned above, the range of wall thickness of the inner and outer metal tubes is 0.002 inch to 0.004 inch. Tubes intended to be slid over severely curved or angled exhaust pipe sections preferably are formed from the thinner metal, as the thinner metal facilitates the necessary bending. The inside diameter of the inner tube will also vary according to the outside diameter of the exhaust pipe and the severity of the bends in the exhaust pipe. A tube to be installed on a straight exhaust pipe, for example, could be of smaller inside diameter than a tube to be installed on a curved pipe. Although this dimension will necessarily vary according to conditions, for a curved exhaust pipe having an outside diameter of two inches, the inside diameter of the inner metal tube may be 2¼ inches and the inside diameter of the outer metal tube may be 2¾ inches, leaving room for insulation of ¼ inch thickness.

It will now be appreciated that the present invention provides an economical, simple, yet highly efficient means for insulating any or all of the various sections of exhaust pipe in an automotive exhaust system, thus functioning as a heat shield, conserving exhaust gas energy for quicker catalytic light-off and absorbing exhaust system noise.

It should also be apparent that the invention is not necessarily limited to all the specific details described in connection with the preferred embodiments, but that changes to certain features which do not alter the overall basic function and concept of the invention may be made without departing from the spirit and scope of the invention, as defined in the appended claims.

What is claimed is:

1. In the exhaust system of a vehicle powered by an internal combustion engine, wherein the exhaust system includes an exhaust pipe containing at least one nonlinear portion therein, an insulated tube surrounding the exhaust pipe, comprising:

an inner metallic tube having a slightly greater diameter than that of the exhaust pipe;

an outer metallic tube of greater diameter than that of the inner metallic tube, the outer tube being radially spaced from the inner metallic tube to form an annulus therebetween;

insulation filling the annulus between the inner and outer tubes, the insulation being capable of withstanding the temperature of exhaust gases in the exhaust pipe;

the inner and outer tubes comprising corrugations having a wall thickness in the approximate range of 0.002 inch to 0.004 inch, the corrugations making the inner and outer tubes sufficiently flexible to have been slid over the nonlinear portions of the exhaust pipe; and means enclosing the insulation adjacent the ends of the insulated tube;

at least the end of the inner tube which comprises the leading end thereof as the insulated tube is slid over the exhaust pipe extending beyond the adjacent end of the outer tube and being angled back toward said adjacent end of he outer tube to enclose the adjacent insulation and to facilitate sliding the insulated tube over the exhaust pipe.

2. A method of insulating an exhaust pipe in the exhaust system of a vehicle powered by an internal combustion engine, wherein the exhaust pipe contains at least one nonlinear portion therein, comprising the steps of:

providing an insulated tube comprising an inner metallic tube having a slightly greater diameter than that of the exhaust pipe, an outer metallic tube of greater diameter than that of the inner metallic tube, and insulation filling the annulus between the inner and outer tubes, the insulation being capable of withstanding the temperature of exhaust gases in the exhaust pipe;

the inner and outer tubes comprising corrugations having a wall thickness in the approximate range of 0.002 inch to 0.004 inch;

sliding the insulated tube over the exhaust pipe, the corrugations and the wall thickness of the inner and outer tubes making the insulated tube sufficiently flexible to move over the nonlinear portions of the exhaust pipe; and enclosing the insulation at the ends of the insulated tube prior to sliding the insulated tube over the exhaust pipe by extending the inner tube beyond the adjacent end of the outer tube and bending the extended portion back toward said adjacent end of the outer tube.

* * * * *